United States Patent [19]

Uchenick

[11] Patent Number: 4,458,315

[45] Date of Patent: Jul. 3, 1984

[54] APPARATUS AND METHOD FOR PREVENTING UNAUTHORIZED USE OF COMPUTER PROGRAMS

[75] Inventor: Gordon Uchenick, Baltimore, Md.

[73] Assignee: Penta, Inc., Baltimore, Md.

[21] Appl. No.: 352,291

[22] Filed: Feb. 25, 1982

[51] Int. Cl.³ .............................................. G06F 1/00
[52] U.S. Cl. .................................................. 364/200
[58] Field of Search ........................................ 364/200

[56] References Cited

U.S. PATENT DOCUMENTS

| | | | |
|---|---|---|---|
| 3,544,777 | 12/1970 | Winkler | 371/68 |
| 3,806,882 | 4/1974 | Clarke | 364/200 |
| 3,978,454 | 8/1976 | Willard | 340/172.5 |
| 4,117,317 | 9/1978 | Dooley, Jr. et al. | 235/307 |
| 4,118,789 | 10/1978 | Casto et al. | 364/900 |

OTHER PUBLICATIONS

Chapter I–The TSS Hardware Device, Wild Hare Co., pp. 1-5, (no date).
Chapter II–Loading the TSS System, Wild Hare Co., pp. 1-5, (no date).

*Primary Examiner*—Raulfe B. Zache
*Attorney, Agent, or Firm*—Pollock, Vande Sande & Priddy

[57] ABSTRACT

An apparatus and method for detecting and preventing the unauthorized use of computer programs. The program to be protected is arranged to store first key information and a key means which is physically separate from the program is provided to the customer with each program which is sold. The key means stores second key information, and is adapted for association with a computer in which the program is to be processed. Either the first program routine, or one which is performed before a significant part of the program, is arranged to access the first and second key information and to perform a comparison operation. If the first and second information bear a predetermined relationship to each other, then it is known that the appropriate key means has been deployed by the customer on the computer, and that the use of the program is authorized. However, if the first and second key information do not bear said predetermined relationship, it is concluded that use of the program is not authorized, and processing of the program may be terminated.

12 Claims, 3 Drawing Figures

APPARATUS AND METHOD FOR PREVENTING UNAUTHORIZED USE OF COMPUTER PROGRAMS

The present invention is directed to an apparatus and method for detecting and preventing the unauthorized use of computer programs.

As is known, computers and the programs for operating them have become increasingly important in recent years. We have truly become a "computerized society" in which computer programs perform a variety of tasks in business, industry, and increasingly, in the home, which traditionally have been performed by people. This has resulted in freeing up people's time for less routine endeavors, in increased efficiency generally, and in a tremendous savings in the cost of doing business. Further, at the present time, software and firmware are increasingly being used to perform functions which heretofore have been performed by electronic circuitry, and are replacing such circuitry at an unprecedented rate.

Unfortunately, as the history of mankind amply demonstrates, whenever one man establishes something of value, it is likely that at some point another man may attempt to take it away from him. Since society has dealt with tangible property for many thousands of years, expedients which are now well known to us such as safes, vaults, safety deposit boxes, etc., have evolved to provide for its safekeeping. However, intangible property, such as the information which is stored in computer programs, cannot be locked up quite so easily.

This is because in the real world such intangible property is inevitably embodied in a physical object such as a tape, disc, or read only memory, and when the property which comprises the program is licensed, dominion over the object is lost, and the program may be copied. Such copies may be made by customers to gain use of additional copies of the program beyond those paid for, or by competitors who may attempt to sell the unauthorized copies for financial gain.

Up to the present time, originators of computer program material have primarily relied on written agreements with customers to prevent copying and unauthorized use. However, such agreements have proven to be relatively inadequate, since discovery of unauthorized copies which are made in breach of the agreement can only be made with great difficulty. Further, it may be impractical or impossible to use such agreements for programs which are sold in the mass market as opposed to to known customers.

It is therefore an object of this invention to provide a more adequate and reliable means of preventing copying of and unauthorized use of computer programs, and particularly to provide a means which does not depend on the good faith of the licensee or customer for its success.

It is a further object of the invention to provide such a means which is relatively inexpensive to build and simple to deploy.

Still further objects of the invention are to provide an improved apparatus, device and method for precluding unauthorized use of computer programs.

In accordance with the invention, the program to be protected is arranged to store first key information, which in the preferred embodiment is a binary number. A key means which is physically separate from the program is provided to the customer with each program which is sold. The key means stores second key information, and is adapted for association with a computer in which the program is to be processed. In the preferred embodiment the second key information which is stored by the key means is the same binary number which is stored in the program itself, and the means for storing the second key information is a hardware-based register.

Either the first program routine, or one which is performed before a significant part of the program, is arranged to access the first and second key information and to perform a comparison operation. If the first and second information bear a predetermined relationship to each other, then it is known that the appropriate key means has been deployed by the customer on the computer and that the use of the program is authorized. However, if the first and second key information do not bear the predetermined relationship to each other, processing of the program is terminated, and thus unauthorized use is prevented.

The invention will be better understood by referring to the accompanying drawings in which.

Figure 1:
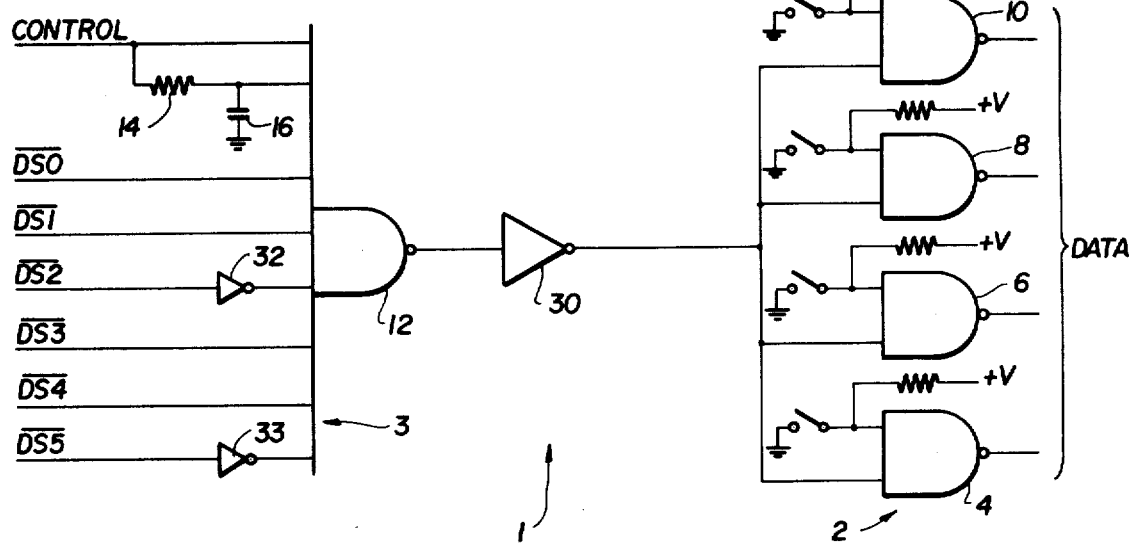
FIG. 1 is a schematic diagram of a preferred embodiment of the key means of the invention.

Referring to FIG. 1, key means 1 is depicted. As discussed above, with each program which is sold or licensed, such a key means is provided to the customer for connection to the computer. The key means stores information which in initial program steps is compared with information which is stored in the program itself to determine whether or not processing of the program will continue or is to be terminated.

While in its broadest aspect, the key means may comprise any storage means which is external to the computer and which may be operably associated therewith, as illustrated in FIG. 1, in the preferred embodiment, such storage means comprises a hardware-based register means 2. This register is comprised of a plurality of two input NAND gates, 4, 6, 8 and 10, each of which has one input tied in common, and has a second input which is selectively programmed by being tied either to ground or to a voltage level, derived from the computer, depending on whether a zero or one is to be stored in the gate. When a pulse is fed to the common inputs, each of the NAND gates outputs either a zero or one depending on the state to which the programmable input is tied. Thus, together the outputs of the four NAND gates comprise a unique four-bit number which is fed to the computer for comparison with the number stored in the program. In the illustrative embodiment, NAND gates 4, 6, 8 and 10 may be comprised of a 7439 NAND gate quad.

The key means 1 also includes accessing circuitry 3, through which signals from the computer may be operable to access the number which is stored in the key. In the preferred embodiment, such accessing circuitry 3 is comprised of NAND gate 12, one input of which is connected to the control bus of the computer through leading edge filter 14, 16, and the other inputs of which are connected to the device select bus of the computer on lines $\overline{DS0}$ to $\overline{DS5}$. The key means is arranged to respond to a predetermined device select code appearing on the device select bus by appropriate connection of inverters in lines connected to the device select inputs of NAND gate 12. For example, in the embodiment illustrated in the figure, since inverters connected in lines $\overline{DS5}$ and $\overline{DS2}$, the device would be accessed by octal 11. It is to be understood that this accessing code is presented for purposes of illustration and that any selected code could be used in an actual embodiment.

To provide the needed read pulse at the output of NAND gate 12, all of the inputs thereto must be high. Thus, in order to access the key, the computer is arranged to emit a control signal on the control bus and the appropriate device select signal on the device bus at the same or overlapping times. This causes the output of NAND gate 12 to go low, and after being fed through inverter 30, a high pulse is inputted to NAND gate quad 2 to read the number which is programmed therein out to the computer on the data bus. The computer is internally arranged to generate a pulse on the CPU board at the time that the control pulse is generated, to accept the data which has been read in on the data bus.

It is to be understood that while the storage portion of key means 1 is illustrated as being a register which is comprised of a plurality of NAND gates, any means which is capable of storing a binary number or other key information, such as any type of register or memory or programmable or programmed means may be used. Also, while a four bit binary number is illustrated, it is to be understood that a code number of any selected number of bits may be employed.

All of the circuits of key means 1 may be housed in a unitary structure which is adapted for connection to the computer. For example, the circuits may be housed in a connector which directly connects to the computer back plane.

Figure 2:
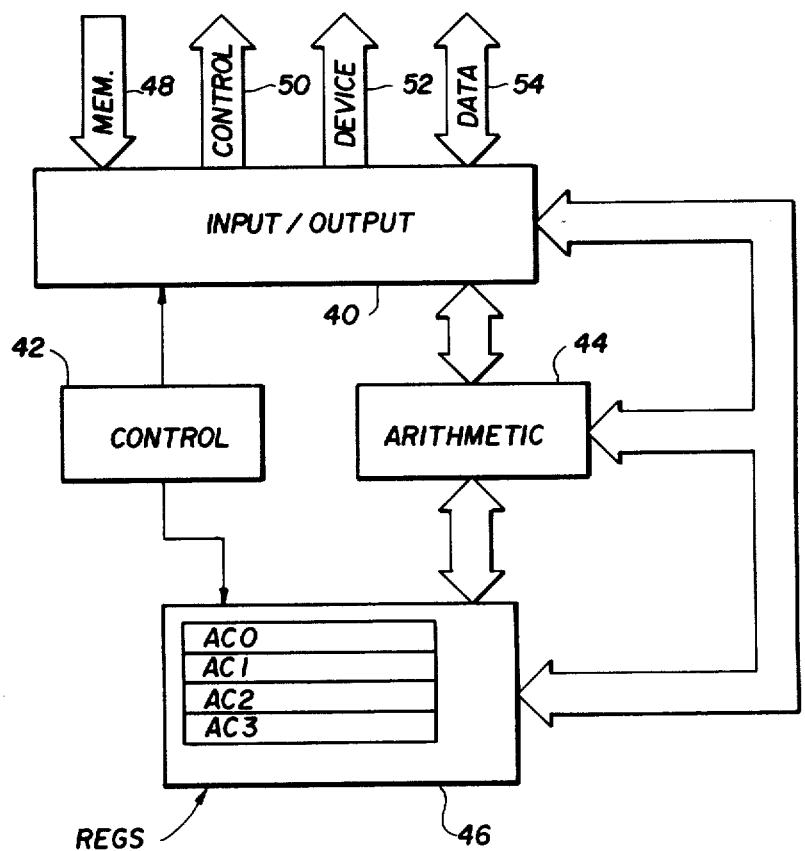
FIG. 2 is a simplified block diagram of a computer in which the key means of FIG. 1 is deployed.

FIG. 2 is a simplified block diagram of a typical computer which may be used in connection with the present invention. It is seen to be comprised of input/output network 40, control unit 42, arithmetic unit 44, and registers unit 46, which is illustratively shown as including accumulators AC0 to AC3. Additionally, memory bus 48, control bus 50, device bus 52, and data bus 54 are interfaced with input/output unit 40. Referring to both FIGS. 1 and 2, it will be understood that the control input to NAND gate 12 in FIG. 1 is fed on control bus 50, the device select signals $\overline{DS0}$ to $\overline{DS5}$ are fed on the device bus 52, and the outputs of the NAND gate quad 2 are inputted to the computer on data bus 54. An illustrative computer which may be used is the Data General Nova 4X.

In accordance with an aspect of the invention, the computer program to be protected has key information stored therein which corresponds to that which is stored in the register of key means 1. In the preferred embodiment, such information may be the same binary number as that stored in the register, or may be a list of numbers, one of which is the same number as is stored in the register. For example, if each customer is assigned a different key number, it is more convenient to store a list covering the numbers of all customers in the program, rather than having to write a different number into each program.

As discussed above, an initial routine of the program is arranged to access the program-stored and register-stored numbers, and to compare them to determine whether the correct key means is deployed, and whether or not processing of the program is authorized and should be continued, or is unauthorized and should be terminated.

Figure 3:
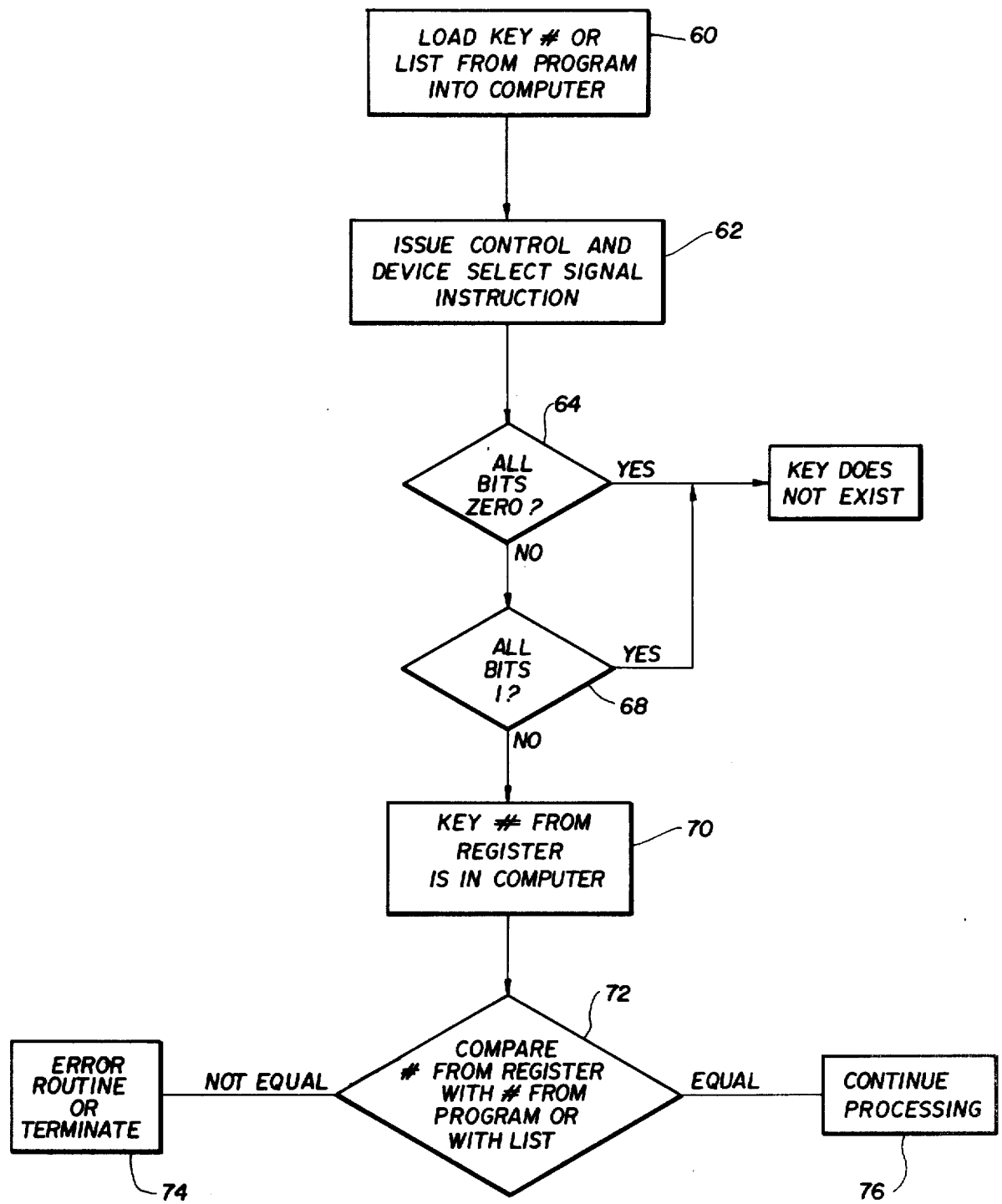
FIG. 3 is a flow chart of a computer program routine for accessing and comparing the key information on the program and in the key means.

A flow chart of the initial program routine is depicted in FIG. 3. In the first program step, shown in block 60, the key number of list of key numbers is read from the program into the computer, and stored in a designated storage means, such as one of the accumulators shown in FIG. 2. In the next program step, illustrated at block 62, the control pulse indicated in FIG. 1 as well as the device select pulses are generated, which cause NAND gate 12 in FIG. 1 to change state, which provides a read pulse for reading out the information which is stored in register 2. This information is inputted to the computer on data bus 54 in FIG. 2, and typically would be stored in a different accumulator than that used for storing the number read from the program.

Program operations 64, 66 and 68 are used to determine if a key means is connected to the computer. The program is written for both positive and negative logic, and thus if it is determined that all bits entered to an accumulator as a result of step 62 are either all 0's or all 1's, it is determined that the key means does not exist, and the program may be terminated.

If it is determined that the key means does exist and that the key number has been entered into the accumulator, indicated by block 70, the next program step is to compare the two key numbers which have been entered to the computer with each other to determine if they are identical. Alternately, if a list of numbers is stored in the program, each number in the list is sequentially compared with the register-stored number until a match is found or all numbers in the list have been compared. If a match exists, it is concluded that the user is authorized, and processing of the program continues, as indicated in block 76. On the other hand, if no match is found, then it is concluded that the user is not authorized, and other further error routines are performed; or processing of the program is terminated, as indicated at block 74.

It should be appreciated that assignment of key information is within the control of the program supplier. Thus, it may be desirable to assign each customer a different key number to be used in connection with all programs which are supplied to that customer, or to assign a different key number for each program which is sold.

Further, it should be understood that while the invention has been described in connection with protecting a software program, it may also find application in protecting the program in a ROM or PROM, and the term "computer program" as used herein is to be interpreted in its broadest construction.

Further, while the invention has been illustrated in connection with a preferred embodiment, it should be understood that many variations will occur to those skilled in the art, and that the scope of the invention is defined only by the claims appended hereto and equivalents.

I claim:

1. An apparatus for detecting unauthorized use of a computer program having first key information stored therein, comprising, means physically separate from said computer program but which may be associated with a computer in which said program is to be processed, for storing second key information, means which is operable before substantial processing of said program has occurred for comparing said first and second key information, and means for generating an error signal if said first and second key information do not bear a predetermined relationship to each other.

2. The apparatus of claim 1, also for preventing unauthorized use of said program further comprising,
   means responsive at least to said error signal for terminating the processing of said program.

3. The apparatus of claims 1 or 2 wherein said means for storing second key information is a device which is connectable to said computer.

4. The apparatus of claim 3 wherein said means for comparing said first and second key information includes means for accessing said first and second information before said comparison is effected.

5. The apparatus of claim 3 wherein said first and second key information each comprise a binary number.

6. The apparatus of claim 5 wherein said means for comparing determines whether said first and second binary numbers are the same.

7. The apparatus of claim 6 wherein said means for storing said second key information comprises a hardware device.

8. The apparatus of claim 7 wherein said hardware device comprises a plurality of AND or NAND gates, each of which stores a bit of information, the state of which is dependent on the voltage level to which a given input of the gate is tied.

9. The apparatus of claim 5 wherein said first key information comprises one of a list of binary numbers which are stored in said computer program and wherein said means for comparing comprises means for sequentially comparing each of said binary numbers in said list with said second key information until either said predetermined relationship is detected or all of said numbers in said list have been compared.

10. A method of preventing unauthorized use of a computer program, comprising the steps of,
    storing first key information in said computer program, providing a device which is connectable to a computer in which said program is to be processed, which stores second key information,
    arranging for said first and second key information to be accessed and compared by said computer before a substantial part of said program has been processed, and,
    arranging for the processing of said program to be terminated if said first and second key information does not bear a predetermined relationship to each other.

11. A hardware or firmware-based key device for preventing unauthorized use of a computer program which stores first key information, comprising
    means for storing second key information which bears a predetermined relationship to said first key information, and
    means for connecting said means for storing said second key information to a computer for processing said program, to permit accessing of said means for storing and retrieval of said stored second key information by said computer.

12. The device of claim 11 wherein said first and second key information comprise identical binary numbers.

* * * * *